(12) United States Patent
Ishida et al.

(10) Patent No.: US 6,280,070 B1
(45) Date of Patent: Aug. 28, 2001

(54) VEHICLE HEADLIGHT

(75) Inventors: Hiroyuki Ishida; Hirohiko Ohshio; Shoji Kobayashi, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/383,281

(22) Filed: Aug. 26, 1999

(30) Foreign Application Priority Data

Sep. 17, 1998 (JP) ................................................. 10-262695

(51) Int. Cl.⁷ ..................................................... F21V 19/02
(52) U.S. Cl. .......................... 362/523; 362/513; 362/284; 362/324; 362/428
(58) Field of Search ................................... 362/523, 420, 362/269, 284, 289, 428, 271, 272, 273, 282, 287, 324, 418, 419, 421, 427, 513, 514, 516, 518, 526, 528, 529, 532

(56) References Cited

U.S. PATENT DOCUMENTS

| | | | | |
|---|---|---|---|---|
| 4,831,506 | * | 5/1989 | Miyazawa | 362/284 |
| 5,197,799 | * | 3/1993 | Dehaene | 362/420 |
| 5,993,032 | * | 11/1999 | Herbers | 362/515 |
| 6,039,466 | * | 3/2000 | Duchenne et al. | 362/515 |
| 6,059,435 | * | 5/2000 | Hamm et al. | 362/514 |
| 6,161,950 | * | 12/2000 | Tsukamoto et al. | 362/513 |

OTHER PUBLICATIONS

Japanese Abstract No. 9092005 dated Apr. 4, 1997.

* cited by examiner

*Primary Examiner*—Sandra O'Shea
*Assistant Examiner*—David V. Hobden
(74) *Attorney, Agent, or Firm*—Sughrue, Mion, Zinn, Macpeak & Seas, PLLC

(57) ABSTRACT

A vehicle headlight capable of switching beams between low and high beams by vertically tilting a reflector by a predetermined angle so that upward forward visibility ahead of a vehicle can be secured during high-beam traveling by using a light distribution pattern having a cutoff line as a low-beam light distribution pattern. An upward deflection prism, projecting substantially perpendicularly downward from an upper side of a reflector up to a vicinity of a height position of an upper end edge of the reflective surface of the reflector, is provided in the vicinity of the front of the front end opening of the reflector. Part of the light reflected from the reflective surface of the reflector is made incident on the upward deflection prism interlocked with the upward tilting of the reflector when a low beam is switched to a high beam, whereby part of the beam is deflected and emitted to the vicinity of a position over a cutoff line by means of the deflecting and transmitting functions of the upward deflection prism.

19 Claims, 14 Drawing Sheets

LOW BEAM

HIGH BEAM

LOW BEAM

HIGH BEAM

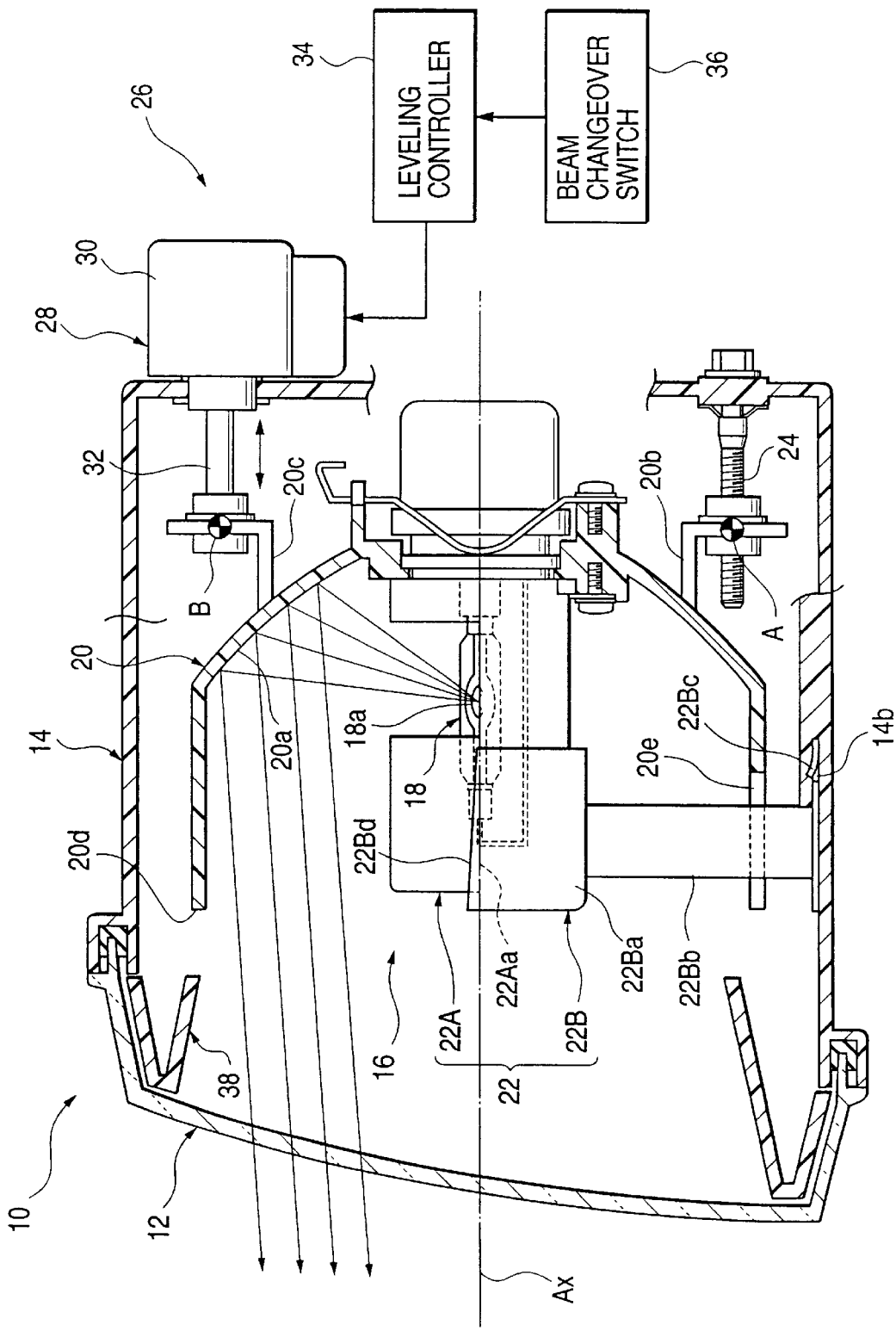

LOW BEAM

HIGH BEAM

VEHICLE HEADLIGHT

BACKGROUND OF THE INVENTION

1. Field of the Invention

This invention relates to a vehicle headlight which is designed to switch beams between low and high beams. More particularly, the invention relates to switching beams between low and high beams by tilting a reflector vertically by a predetermined angle.

2. Description of the Related Art

Vehicle headlights are designed to emit a low or high beam by causing light from a light source bulb to be reflected forward by a reflector. With respect to light sources (discharge light-emitting portions or filaments), though different light sources are generally used for low and high beams respectively because the direction of emitting the low beam differs from that of emitting the high beam, there are also known vehicle headlights using a single light source. Particularly in such a two-lamp type vehicle headlight using a discharge bulb as a light source bulb, a single light source arrangement will have to be made often.

In the case of a vehicle headlight using such a single light source, a low beam is switched to a high beam and vice versa by mechanically displacing optical elements including a light source bulb, a reflector and the like, and a beam switching device is installed accordingly because it is reasoned to use the beam switching device for switching beams by vertically tilting the reflector by a predetermined angle. By adopting the beam switching device, the actuator of a leveling unit can also be used as the actuator of the beam switching device.

However, the following problems will arise when such a reflector-tilting type beam switching device is introduced.

As a low-beam light distribution pattern, it is preferred to use a light distribution pattern P(L) having a clear cutoff line (a light-to-shade boundary line) CL as shown in FIG. 14A in view of securing forward visibility for automobile drivers as well as preventing a glare from those driving oncoming vehicles. When an attempt is made to switch beams by vertically tilting the reflector, however, the low and high beams are to be emitted with the same light distribution pattern. Consequently, the adoption of the light distribution pattern P(L) with the cutoff line CL as a low-beam light distribution pattern will result in providing a light distribution pattern P(H) having the cutoff line CL for a low beam as shown in FIG. 14B, thus developing the problem of failing to secure upward forward visibility (the portion shown by A therein) ahead of a vehicle.

SUMMARY OF THE INVENTION

An object of the present invention made in view of the aforementioned situation is to provide a vehicle headlight capable of switching beams between low and high beams by vertically tilting a reflector by a predetermined angle so that upward forward visibility ahead of a vehicle can be secured during high-beam traveling by using a light distribution pattern having a cutoff line as a low-beam light distribution pattern.

According to the present invention, it is intended to accomplish the object above by emitting part of the existing beam or a newly generated beam in the upward direction of a cutoff line in the way interlocked with the upward tilting of a reflector when a low beam is switched to a high beam.

Therefore, to achieve the above objective, there is provided, a vehicle headlight that includes the following: a light source bulb; a reflector for emitting a beam with a light distribution pattern having a cutoff line by reflecting light from the light source bulb forward; a lamp body for tiltably supporting the reflector; and a beam switching device for selectively switching beams between low and high beam by vertically tilting the reflector by a predetermined angle.

To further achieve the above objective, the vehicle headlight includes beam deflecting and emitting means for deflecting and emitting part of the beam to the vicinity of a position over the cutoff line in the way interlocked with the upward tilting of the reflector when the low beam is switched to the high beam.

Furthermore, to achieve the above objective, the vehicle headlight includes additional-beam generating means for generating a beam to be additionally emitted to the vicinity of the position over the cutoff line in the way interlocked with the upward tilting of the reflector when the low beam is switched to the high beam.

The aforementioned "light source bulb" for use is not limited to a specific kind of light source bulb but may be a discharge bulb, an incandescent bulb (including a halogen lamp) or the like, for example.

The aforementioned "predetermined angle" is such that the degree of the angle is not limited to a specific value as long as the vertical tilting by the predetermined angle allows the function of each of the low and high beams to be demonstrated; for example, the angle may be set at a suitable value (e.g., 3°) in the range of about 2–4° (or 2.5–3.5°).

BRIEF DESCRIPTION OF THE DRAWINGS

The above objectives and advantages of the present invention will become more apparent by describing in detail preferred embodiments thereof with reference to the attached drawings in which:

FIG. 10 is a sectional side view of a vehicle headlight as a third embodiment of the present invention;

DESCRIPTION OF THE PREFERRED EMBODIMENTS

Hereinafter, preferred embodiments of a vehicle headlight will be described in detail with reference to the attached drawings. However, the preferred embodiments are merely an example of the present invention, and thus, the specific features described below are merely used to more easily describe such embodiments and to provide an overall understanding of the present invention. Accordingly, one skilled in the art will readily recognize that the present invention is not limited to the specific embodiment described below. Furthermore, the description of various configurations of the present invention which would have been known to one skilled in the art are omitted for the sake of clarity and brevity.

A first embodiment of the present invention will first be described.

Figure 1:
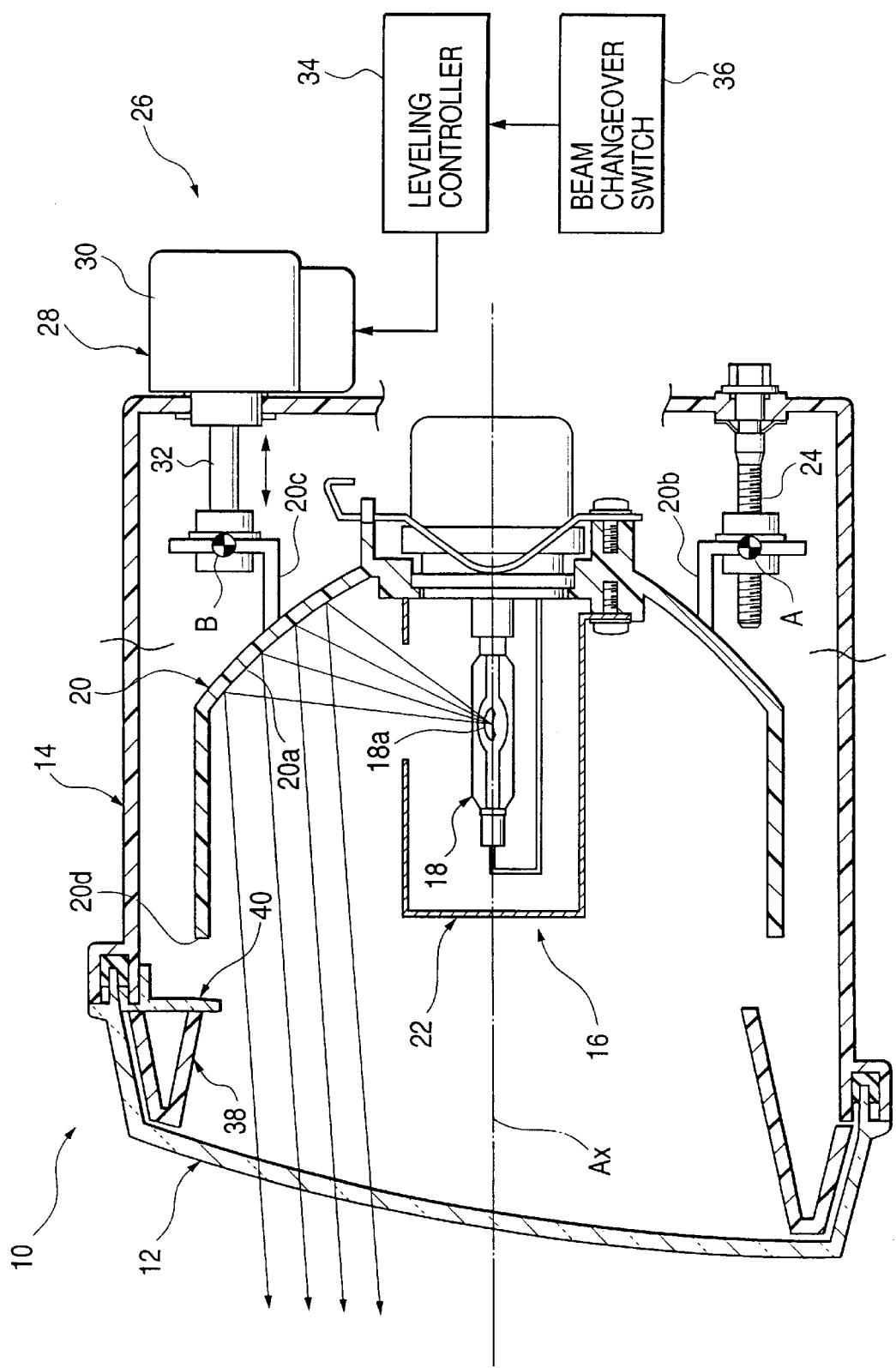
FIG. 1 is a sectional side view of a vehicle headlight as a first embodiment of the present invention.

FIG. 1 is a sectional side view of a vehicle headlight of a first embodiment in the present invention.

As shown in FIG. 1, a vehicle headlight 10 according to the present invention is fitted with a reflector unit 16 in a lamp chamber formed with a lens 12 and a lamp body 14 so that the reflector unit 16 can be tilted in the vertical and lateral directions.

The reflector unit 16 includes a light source bulb (a metal halide discharge bulb) 18, a reflector 20 for fixedly supporting the light source bulb 18, and a shade 22 for surrounding the light source bulb within a predetermined range.

The lens 12 is a see-through lens with the reflector unit 16 provided with the function of controlling light distribution. More specifically, the reflector 20 is fitted with a reflective surface 20a for forwardly reflecting light from the discharge light-emitting portion 18a of the light source bulb 18, and the diffusing, deflecting and reflecting functions of the reflective surface 20a are utilized for the emission of beams with a light distribution pattern as will be described hereinafter.

The reflector 20 is supported by the lamp body 14 via aiming screws 24 at brackets 20b each formed in both lateral lower end portions of the reflector 20 and also supported by the lamp body 14 via the actuator 28 of a leveling unit 26 at a bracket 20c formed in the upper right end portion (or the upper left end portion).

Figure 2:
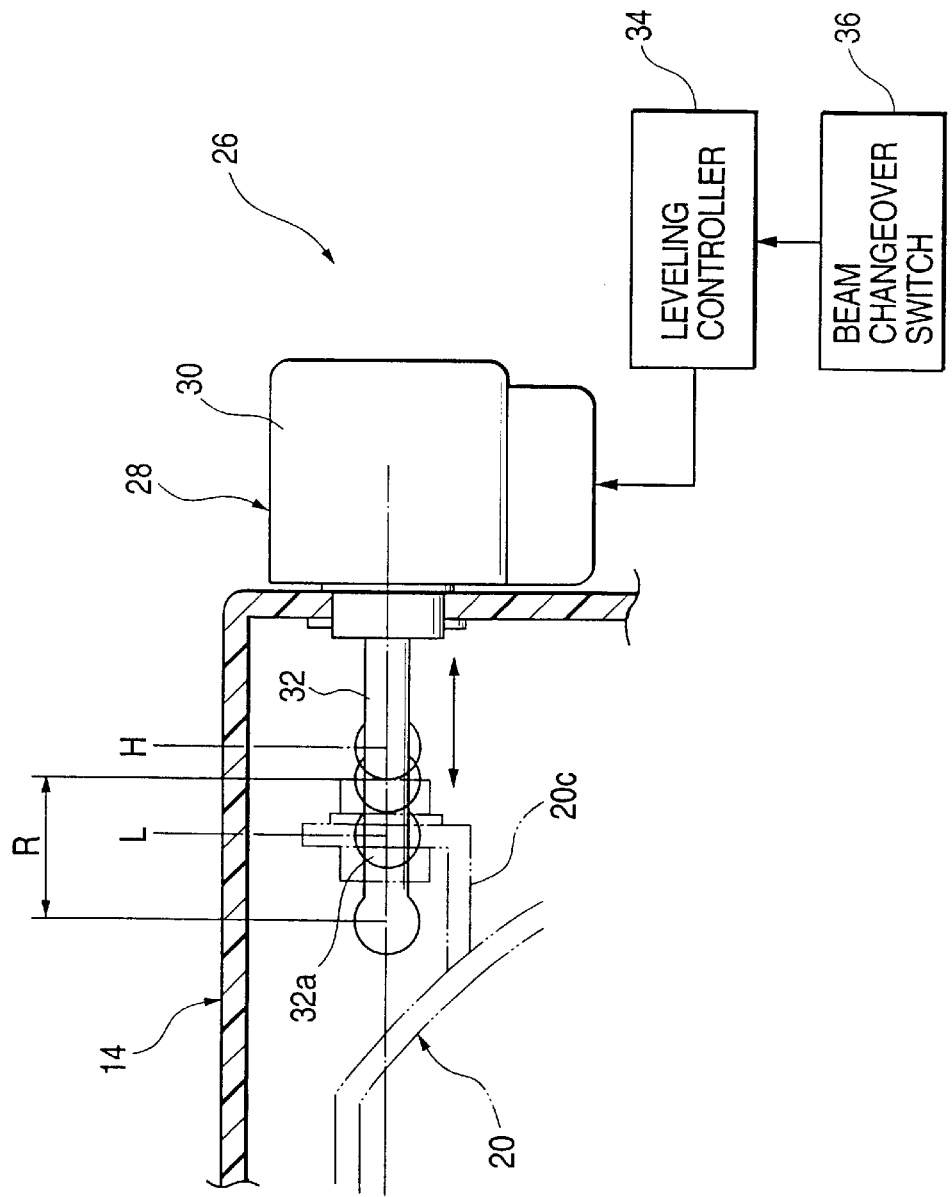
FIG. 2 is a detailed side view of the actuator of a leveling unit in the first embodiment of the present invention.

As shown in FIG. 2 in detail, the actuator 28 includes a actuator body 30 fixed to the lamp body 14, and an output rod 32 projecting forward from the actuator body 30, the spherical leading end portion 32a of its output rod 32 being coupled to the bracket 20c of the reflector 20.

The leveling controller 34 of the leveling unit 26 causes the actuator 28 to be driven as the posture of a vehicle body changes and by displacing the output rod 32 longitudinally, makes the reflector unit 16 tilt vertically with a point A as a fulcrum and with a point B as a point of application in FIG. 1 whereby to keep the direction of emitting the beam optimized at all times as the posture of the vehicle body changes. In this case, this leveling control is not performed during high-beam traveling but performed during low-beam traveling.

Figure 4A:
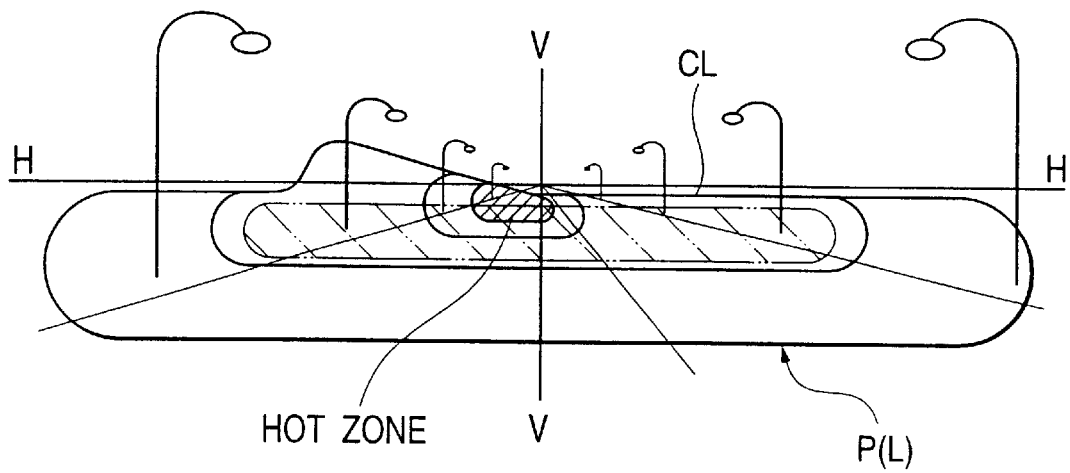
FIGS. 4A and 4B are light distribution patterns showing the operation of the first embodiment of the present invention.

The adjustment of the optical axis of the reflector unit 16 is made by adjusting each aiming screw 24 in such a state that the output rod 32 of the actuator 28 has been set at a reference leveling position L of FIG. 2. The axis adjustment is intended to direct the optical axis Ax of the reflector 20 downward by 0.57° relative to the horizontal direction and when the optical axis adjustment is completed, there can be provided a low-beam light distribution pattern P (L) having a clear cutoff line (a light-to-shade boundary line) CL with its horizontal line portion positioned at 0.57° D as shown in FIG. 4A. The tilted angle position of the reflector 20 then is hereinafter called a "reference leveling angle position."

A multiple closed curve shown by a solid line in the light distribution pattern P (L) indicates zone divisions that are irradiated in such a way that the inner ones are made gradually brighter; that is, the central zone shown by slanting lines is the brightest hot zone.

As shown in FIG. 2, a leveling adjustment range R is set so that when the output rod 32 is displaced up to the rear end position of the leveling adjustment range R, the reflector 20 will be directed upward by 2° relative to the reference leveling angle position in one stroke, whereas when the output rod 32 is displaced up to the front end position of the leveling adjustment range R, the reflector 20 may be directed downward by 3° relative to the reference leveling angle position in one stroke.

The leveling unit 26 also functions as a beam switching device for performing not only the leveling control as mentioned above but also switching beams between low and high beams. Consequently, a beam switching signal is inputted to the leveling controller 34 from a beam changeover switch 36.

As mentioned above, the leveling control is carried out by displacing the output rod 32 of the actuator 28 within the leveling adjustment range R. When a high-beam switching signal is inputted to the leveling controller 34 from the beam changeover switch 36, the output rod 32 is displaced up to a high-beam switching position H further rearward than the rear end position of the leveling adjustment range R to have the reflector unit 16 tilted up to an angle position of 3° upward relative to the reference leveling angle position, whereby the low beam is switched to the high beam.

As shown in FIG. 1, an extension reflector 38 is provided in front of the reflector 20 in the lamp chamber in such a way as to surround the front end opening 20d of the reflector 20. This extension reflector 38 is fixedly supported by the lamp body 14.

There is also provided an upward deflection prism 40 projecting substantially perpendicularly downward from the upper side of the reflector 20 up to the vicinity of the height position of the upper end edge of the reflective surface 20a of the reflector 20. The upward deflection prism 40 is fixedly supported by the lamp body 14 so that its upper end portion may be clamped between the lamp body 14 and the extension reflector 38. The upward deflection prism 40 is a prism whose wall thickness is increased from its lower end portion to its upper portion whereby to deflect light passing through the upward deflection prism 40 upward by 4°.

Figure 3A:
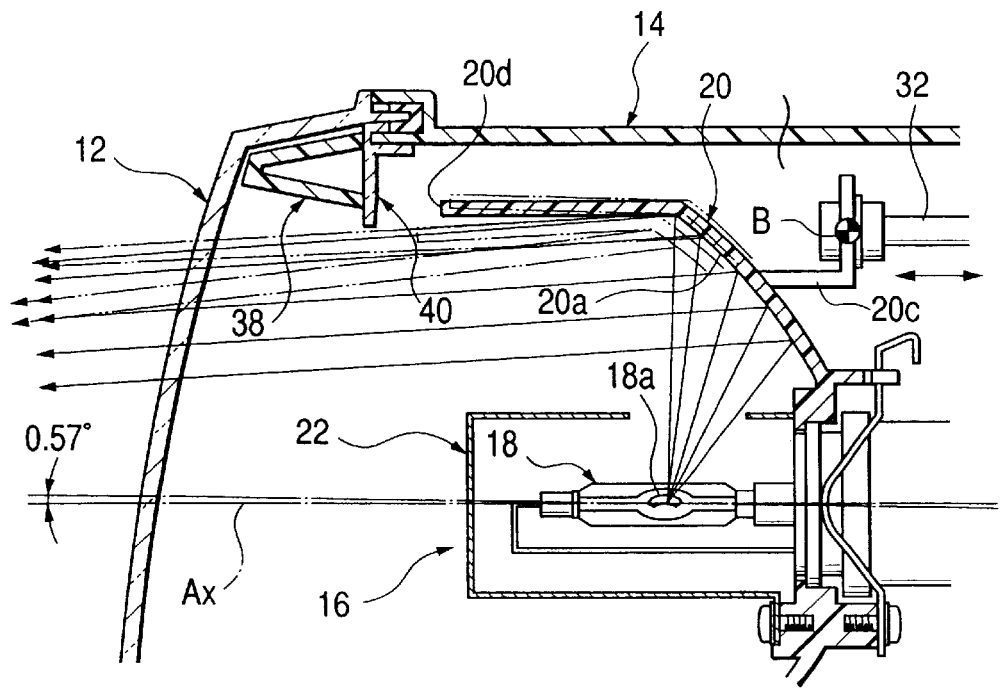
FIGS. 3A and 3B are side views of the principal part showing the operation of the first embodiment of the present invention.
Figure 3B:
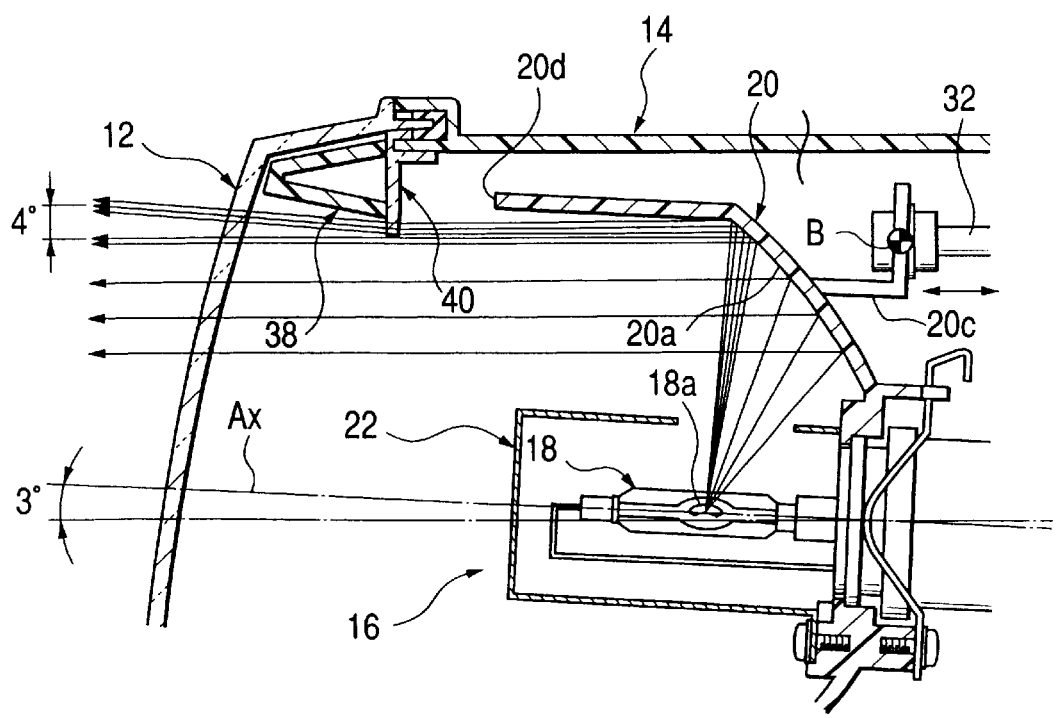

As shown in FIG. 3A, the light reflected from the reflective surface 20a of the reflector 20 is not incident on the upward deflection prism 40 at the upwardly-tilted angle (i.e., maximum 2° upward from the reference leveling angle position) of the reflector 20 within a low-beam leveling adjustment range. As shown in FIG. 3B, however, the light reflected from the reflective surface 20a of the reflector 20 is incident on the upward deflection prism 40 when the reflector 20 is held at a high-beam tilting angle position (i.e., 3° upward from the reference leveling angle position) due to the switching of beams. Then, the light caused to be incident on the upward deflection prism 40 is deflected upward by 4° due to the prism action and passed through the upward deflection prism 40 before being emitted forward as an turned-up beam.

Figure 4B:
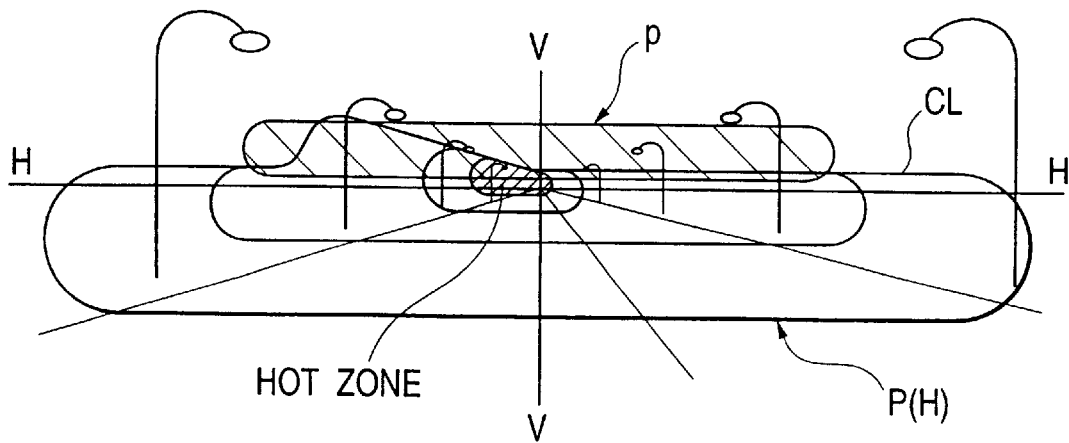

FIG. 4B shows a light distribution pattern when the reflector 20 is directed upward up to the high-beam tilting angle position, that is, a high-beam light distribution pattern P(H).

As shown in FIG. 4B, the light distribution pattern P(H) is substantially similar to what is acquired by directing the low-beam light distribution pattern P(L) shown in FIG. 4A upward by 3°. However, both the patterns mentioned above are different in that an upward emission pattern p is formed in such a way as to straddle the cutoff line CL vertically in the case of the light distribution pattern P(H). The upward emission pattern p is derived from the upwardly-deflected emission light incident on the upward deflection prism 40 and passed therethrough after being upwardly deflected; in other words, it is widened up to about 3° over the horizontal portion of the cutoff line CL of the light distribution pattern P(H) by deflecting the light sent upon the position shown by a chain double-dashed line in the light distribution pattern P(L).

In this embodiment of the invention, part of the beam is deflected and emitted to the vicinity of a position over the cutoff line CL in the way interlocked with the upward tilting of the reflector 20 by providing the upward deflection prism 40 when the low beam is switched to the high beam. Accordingly, the low-beam light distribution pattern P(L) excellent in remote visibility is secured, so that the high-beam light distribution pattern P(H) capable of sufficiently securing upward forward visibility ahead of the vehicle is obtainable.

With the beam deflected and emitted to the vicinity of the position over the cutoff line CL when the low beam is switched to the high beam, moreover, the definition of the cutoff line CL of the high-beam light distribution pattern P(H) can be lowered, whereby a feeling of wrongness because of the presence of the cutoff line CL in the light distribution pattern P(H) becomes reducible during the high-beam traveling.

In this embodiment of the invention, further, the beam deflected and emitted to the vicinity of a position over the cutoff line CL can be obtained by a simple arrangement because the upward deflection prism 40 is employed as a beam deflecting and emitting means.

In this embodiment of the invention, moreover, though the upward deflection prism 40 is a simple prism for deflecting the beam upward only, the upward emission pattern p may be made a wide diffusion pattern by providing a lateral diffusion step for the upward deflection prism 40. In addition, the upward emission pattern p may be widened upward by providing a curvature in the vertical direction for the upward deflection prism 40.

A modified example of the first embodiment of the present invention will now be described.

Figure 5A:
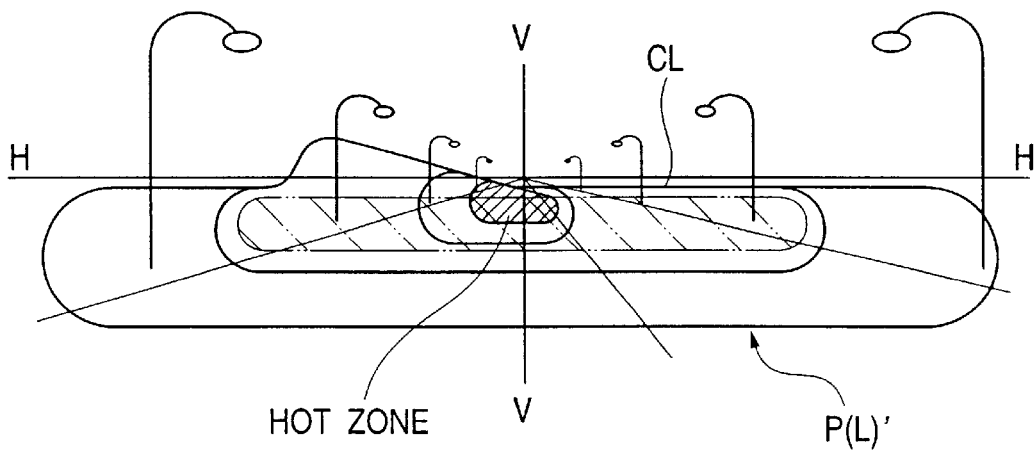
FIGS. 5A and 5B are light distribution pattern charts showing the operation of a modified example of the first embodiment of the present invention.
Figure 5B:
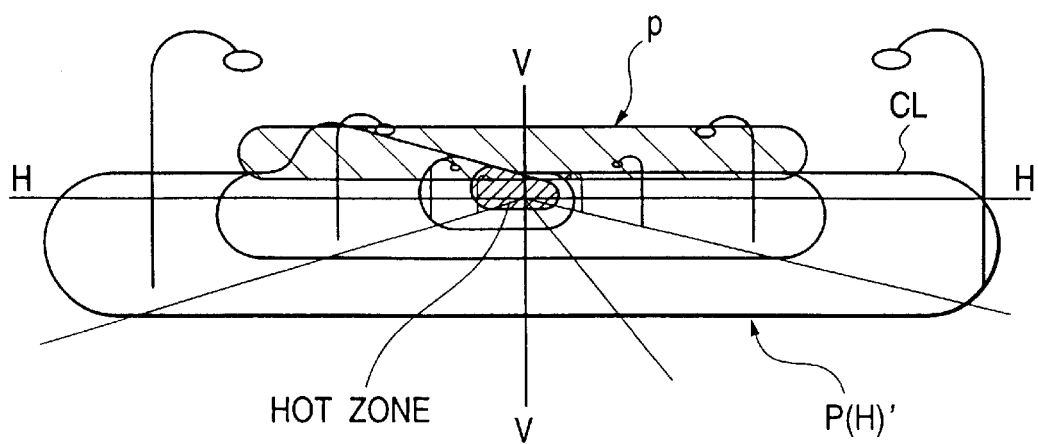

FIGS. 5A and 5B show a light distribution pattern formed in a modified vehicle headlight embodying the present invention.

As shown in FIG. 5A, in this modified embodiment of the present invention, a light distribution pattern P(L)' having the cutoff line CL is adopted as a low beam light distribution pattern first and then its hot zone is set at a position (e.g., 2.5°, in the vicinity of D–V) closer to the center slightly lower than the normal light distribution pattern (the light distribution pattern P(L) shown in FIG. 4A and further the vertical tilting angle of the reflector 20 is set larger (e.g., about 4°) at the time of switching beams.

The adoption of the light distribution pattern P(L)' prevents the hot zone of a high beam light distribution pattern P(H)' from slipping off upward as shown in FIG. 4B even though the upward tilting angle is set larger when the low beam is switched to the high beam. Thus, upward forward visibility ahead of the vehicle during the high-beam traveling is made improvable further by setting the upward tilting angle larger because the position of the cutoff line CL of the high-beam light can be set distribution pattern P(H)' on the high side.

Since it is similar to what is in the first embodiment of the present invention that the upward emission pattern p formed by the upward deflection prism 40 is formed so that the upward emission pattern p is widened up to about 3° over the horizontal portion of the cutoff line CL of the light distribution pattern P(H)', the upward forward visibility ahead of the vehicle during the high-beam traveling is improved to the extent that the position of the cutoff line CL is set on the high side.

When the arrangement above is made, however, a short-distance road surface ahead of the vehicle becomes extremely bright during the low-beam traveling as shown in FIG. 5A and this results in lowering the visibility of a remote road surface. Therefore, it may be determined whether to select the arrangement of this modified embodiment of the invention or that of the first embodiment thereof, depending on attaching importance to selecting the low- or high-beam light distribution pattern. Incidentally, an intermediate light distribution pattern between those of the modified and first embodiments thereof may be adopted.

A second embodiment of the present invention will now be described.

Figure 6:
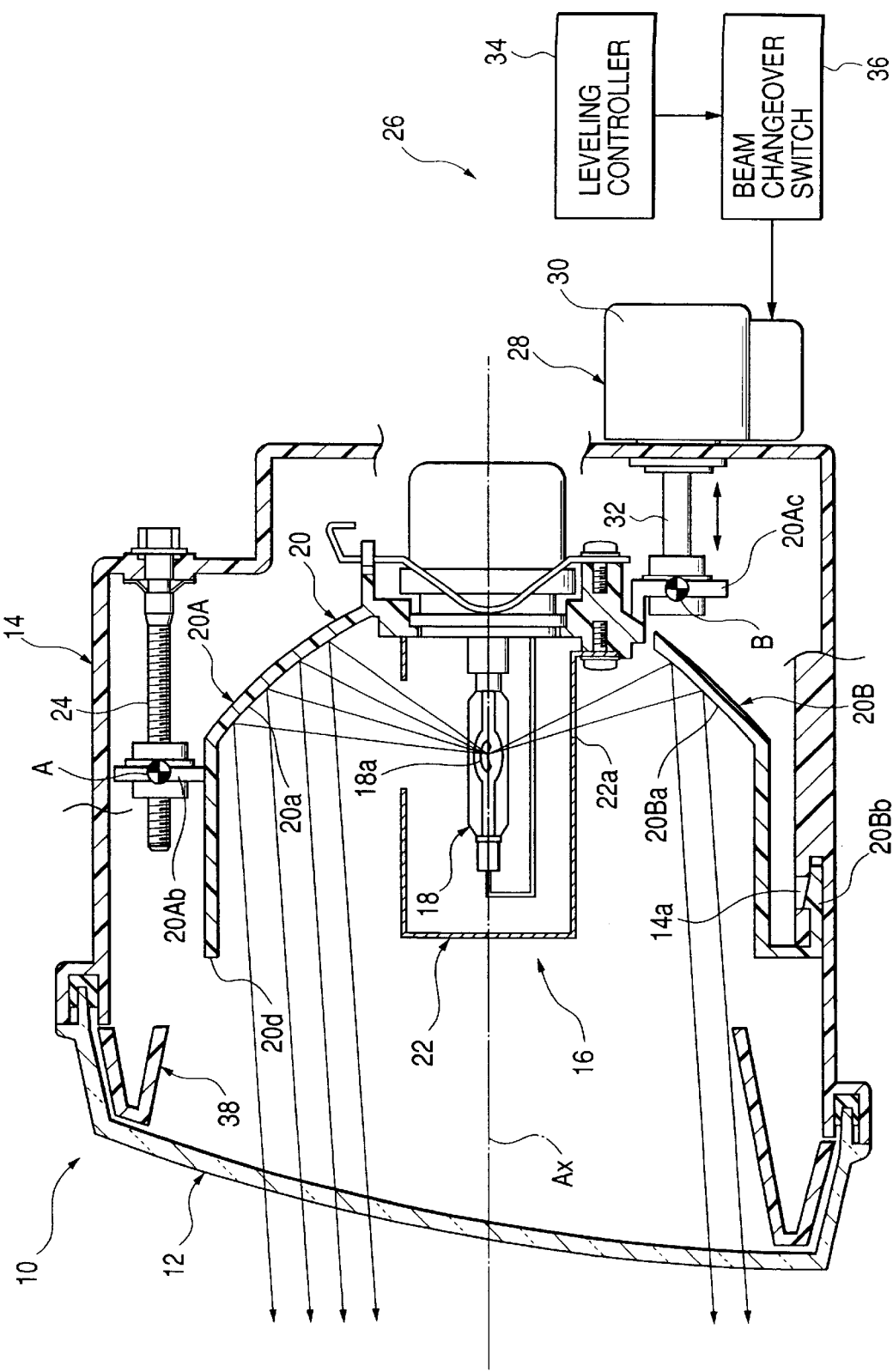
FIG. 6 is a sectional side view of a vehicle headlight as a second embodiment of the present invention.

FIG. 6 is a sectional side view of a vehicle headlight according to the second embodiment of the present invention.

As shown in FIG. 6, the reflector 20 in the vehicle headlight 10 according to this embodiment of the invention is divided into an upper reflector 20A for fixedly supporting the light source bulb 18 and a lower reflector 20B disposed under the upper reflector 20A. The upper reflector 20A is tiltably supported by the lamp body 14, whereas the lower reflector 20B is fixedly supported by the lamp body 14.

Figure 7:
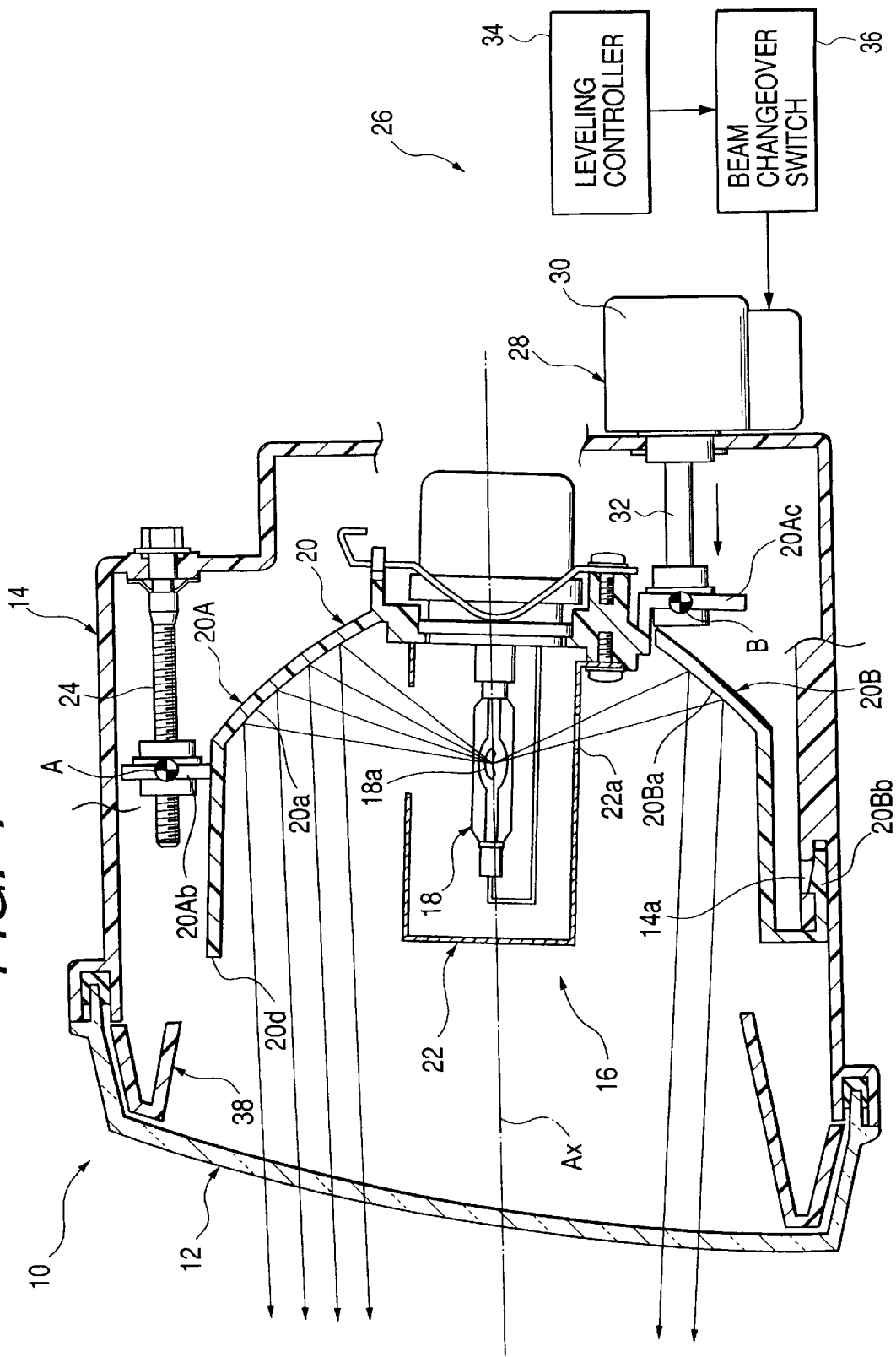
FIG. 7 is a sectional side view showing the operation of the second embodiment of the present invention.
Figure 8:
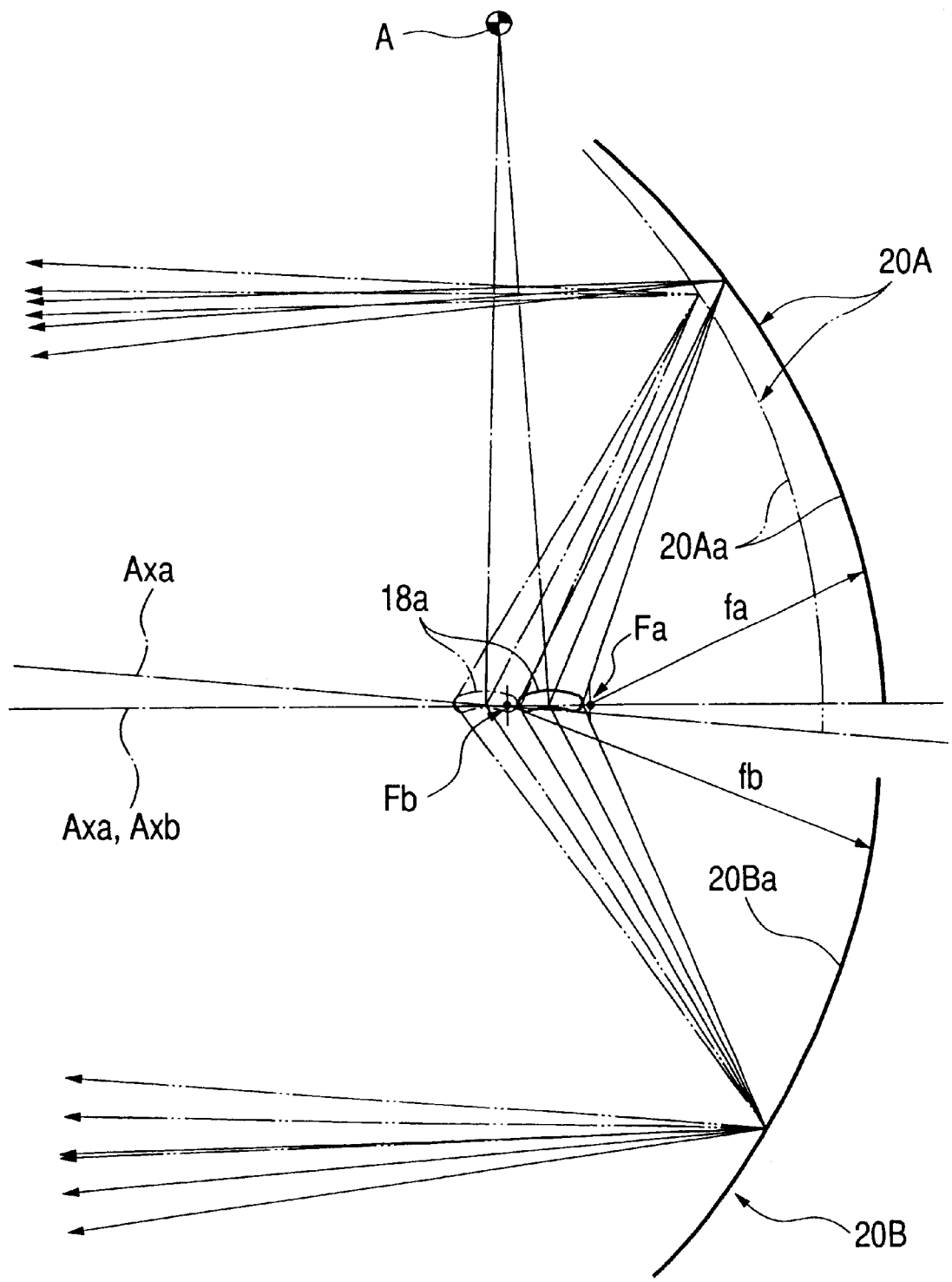
FIG. 8 is a beam tracking diagram showing the operation of the second embodiment of the present invention.

The upper reflector 20A is supported by the lamp body 14 via the aiming screw 24 at a bracket 20A*b* formed in the upper end portion of the upper reflector 20A and supported by the lamp body 14 via the actuator 28 of the leveling unit 26 at a bracket 20A*c* formed in the lower end portion thereof, the upper reflector 20A being tilted vertically with points A and B as points of application. When the upper reflector 20A is tilted upward as shown in FIG. 7, the discharge light-emitting portion 18*a* of the light source bulb 18 is displaced forward as shown in FIG. 8.

On the other hand, the lower reflector 20B is fixedly supported by the lamp body 14 by fit-mating a lance bracket 20B*b* formed in the lower end portion of the lower reflector 20B with a lance mating portion 14*a* formed on the inner surface of the base of the lamp body 14.

In the second embodiment of the present invention, a cutout hole 22*a* is formed in the lower portion of the shade 22 so that light from the light source bulb 18 may also be incident on the reflective surface 20B*a* of the lower reflector 20B.

Figure 9A:
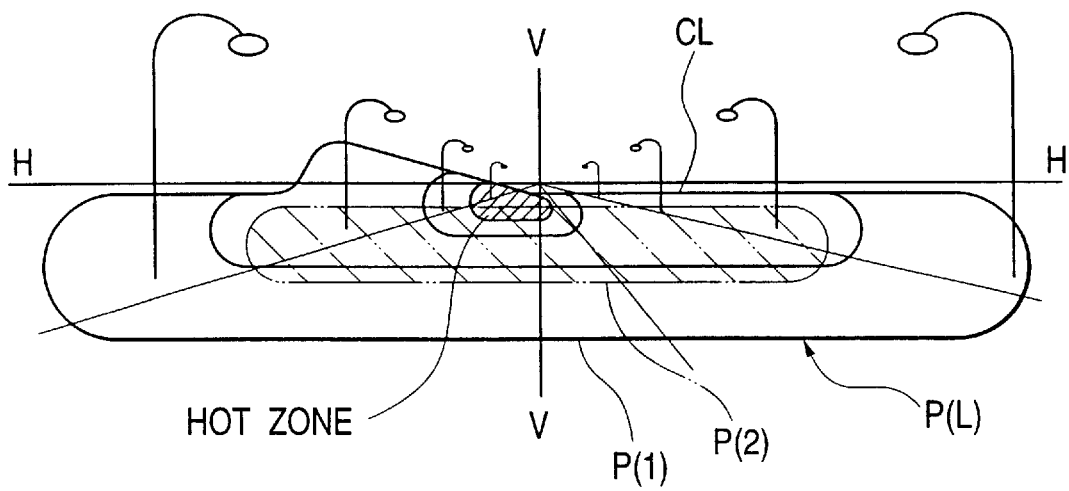
FIGS. 9A and 9B are light distribution pattern charts showing the operation of the second embodiment of the present invention.
Figure 9B:
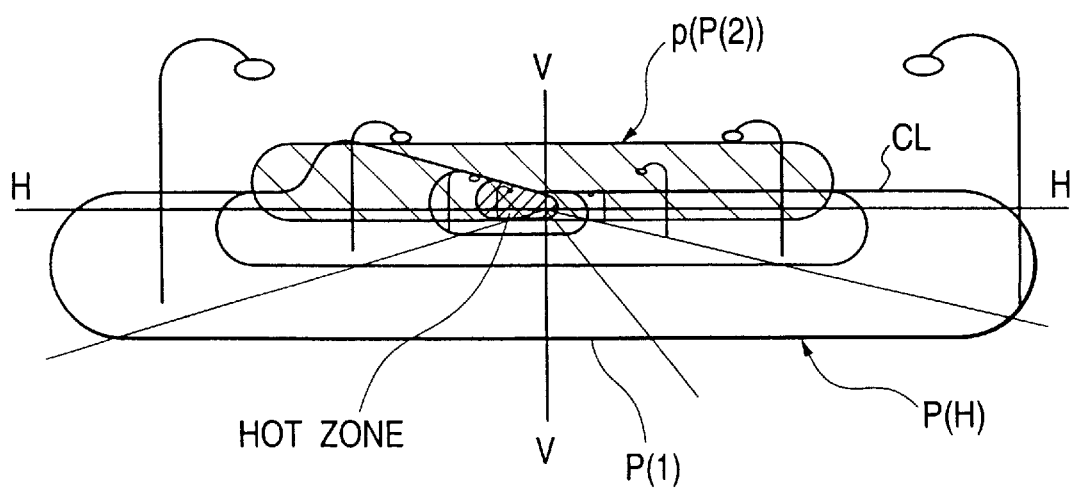

In this embodiment of the present invention, further, while the upper reflector 20A remains at the high-beam tilting angle position, a first light distribution pattern P(1) having the cutoff line CL is formed by the upper reflector 20A, whereas a second light distribution pattern P(2) is formed under the cutoff line CL by the lower reflector 20B, the low-beam light distribution pattern P(L) being formed with a light distribution pattern made of synthesizing both the light distribution patterns P(1) and P(2). When the upper reflector 20A is placed at the high-beam tilting angle position as shown in FIG. 7, the first light distribution pattern P(1) formed by the upper reflector 20A is emitted upward to the extent of the upward tilted angle position of the upper reflector 20A as shown in FIG. 9B. Whereas the second light distribution pattern P(2) formed by the lower reflector 20B is displaced upward relative to the first light distribution pattern P(1), deflected and emitted to the vicinity of a position over the cutoff line CL of the first light distribution pattern P(1).

The reason for causing the light distribution pattern to be generated when the low beam is switched to the high beam will be explained with reference to FIG. 8.

As shown in FIG. 8, the reflective surface 20Aa of the upper reflector 20A is formed with a rotary parabolic surface having a focal length of fa as a reference surface, the focal length fa having a point Fa in the vicinity of the rear of the discharge light-emitting portion 18a of the light source bulb 18 as a focal point. Whereas the reflective surface 20Ba of the lower reflector 20B is formed with a rotary parabolic surface having a focal length of fb (fb>fa) as a reference surface, the focal length fb having a point Fb in the vicinity of the front of the discharge light-emitting portion 18a of the light source bulb 18 as a focal point.

While the optical axis Axa of the upper reflector 20A coincides with the optical axis Axb of the lower reflector 20B, the light reflected from the reflective surface 20Aa of the upper reflector 20A and the light reflected from the reflective surface 20Ba of the lower reflector 20B are emitted forward as downward beams.

When the upper reflector 20A is tilted upward and placed at the high-beam tilting angle position, the light reflected from the reflective surface 20Aa of the upper reflector 20A is emitted upward to the extent of the upward tilting as shown by chain double-dashed lines of FIG. 8. However, the light reflected from the reflective surface 20Ba of the lower reflector 20B is displaced forward relative to the lower reflector 20B whereby to decrease the incident angle of light incident on the reflective surface 20Ba from the discharge light-emitting portion 18a, and the reflected light is emitted upward at an angle greater than the upward tilting of the upper reflector 20A.

Thus, the second light distribution pattern P(2) is displaced upward relative to the first light distribution pattern P(1), deflected and emitted as the upward emission pattern p to the vicinity of the position over the cutoff line CL.

In order to increase the quantity of upward displacement of the second light distribution pattern P(2), it is only needed to decrease further the incident angle of light incident on the reflective surface 20Ba from the discharge light-emitting portion 18a due to the upward tilting of the upper reflector 20A. Accordingly, the position of the fulcrum A of the vertical tilting is preferably set at a position above the optical axis Axa and forward further than the discharge light-emitting portion 18a.

As set forth in detail, this embodiment of the invention is arranged so that by forming the reflector 20 into two reflectors and tilting only the reflector 20A, the light reflected from the lower reflector 20B may be deflected and emitted to the vicinity of the power over the cutoff line CL in the way interlocked with the upward tilting of the upper reflector 20A when the low beam is switched to the high beam. Consequently, the light distribution pattern P(H) capable of sufficiently securing the upward forward visibility ahead of the vehicle during the high-beam vehicle traveling is made obtainable by securing the light distribution pattern P(L) excellent in remote visibility during the low-beam traveling.

Since the beam is deflected and emitted to the vicinity of the position over the cutoff line CL when the low beam is switched to the high beam, moreover, the definition of the cutoff line of the high-beam light distribution pattern P(H) can be lowered, whereby a feeling of wrongness because of the presence of the cutoff line CL of the light distribution pattern P(H) during the high-beam traveling can be reduced.

In the second embodiment of the present invention, further, the quantity of light deflected and emitted to the vicinity of the position over the cutoff line CL can be secured sufficiently because the light reflected from the lower reflector 20B is totally directed to the vicinity of the position over the cutoff line when the low beam is switched to the high beam.

Even in the second embodiment of the present invention, moreover, the modified light distribution pattern (see FIGS. 5A and 5B) of the first embodiment of the present invention may be adopted as a basic light distribution pattern and in that case, function and effect similar to those in the modified embodiment thereof are obtainable.

A third embodiment of the present invention will subsequently be described.

FIG. 10 is a sectional side view of a vehicle headlight according to the third embodiment of the present invention.

As shown in FIG. 10, the vehicle headlight 10 according to this embodiment of the invention is similar to what has been referred to in the first embodiment of the present invention as far as the basic structure of the lamp. However, the upward deflection prism 40 is not installed and the construction of a shade 22 is different.

More specifically, the shade 22 includes a first shade 22A fixedly supported by the reflector 20 and a second shade 22B fixedly supported by the lamp body 14.

A cutout portion 22Aa whose lower-side portion further than the optical axis Ax of the reflector 20 has been cut out is formed in the leading end portion of the first shade 22A.

On the other hand, the second shade 22 includes a shade body 22Ba for covering the substantially lower half of the leading end portion of the first shade 22A and a stay 22Bb for supporting the shade body 22Ba. The second shade 22B is fixedly supported by the lamp body 14 by press-fitting a cut-raised piece 22Bc formed in the lower end portion of the stay 22Bb into a groove portion 14b formed in the inner surface of the base of the lamp body 14 from forward. In this case, a cutout portion 20e for preventing interference with the second shade 22B is formed in the lower end portion of the reflector 20.

Figure 12A:
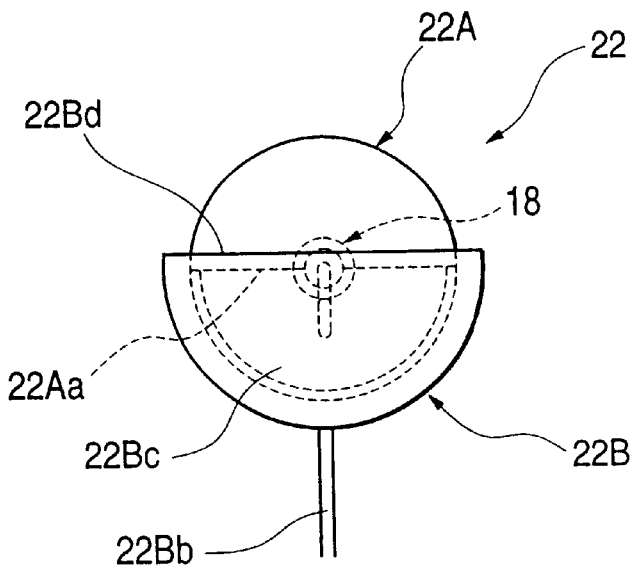
FIGS. 12A and 12B are elevational views of a shade showing the operation of the third embodiment of the present invention.
Figure 13A:
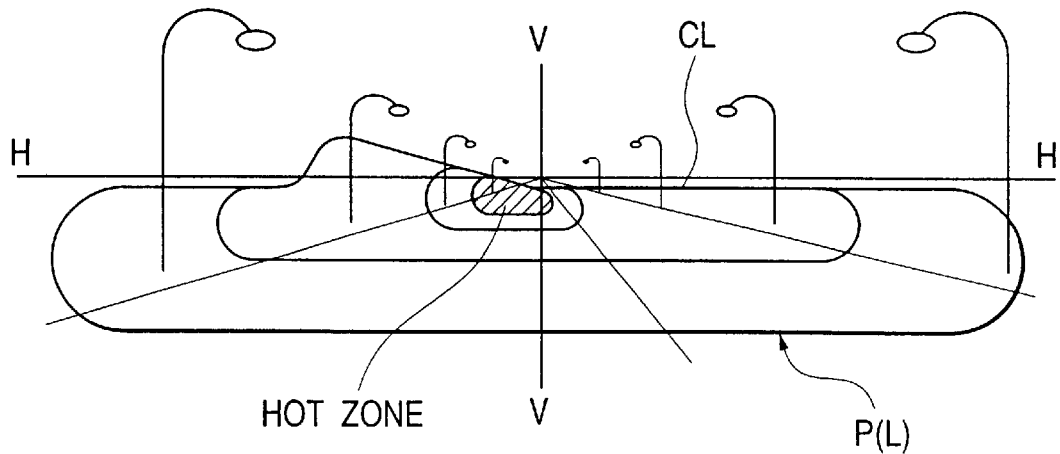
FIGS. 13A and 13B are light distribution pattern charts showing the operation of the third embodiment of the present invention.
Figure 13B:
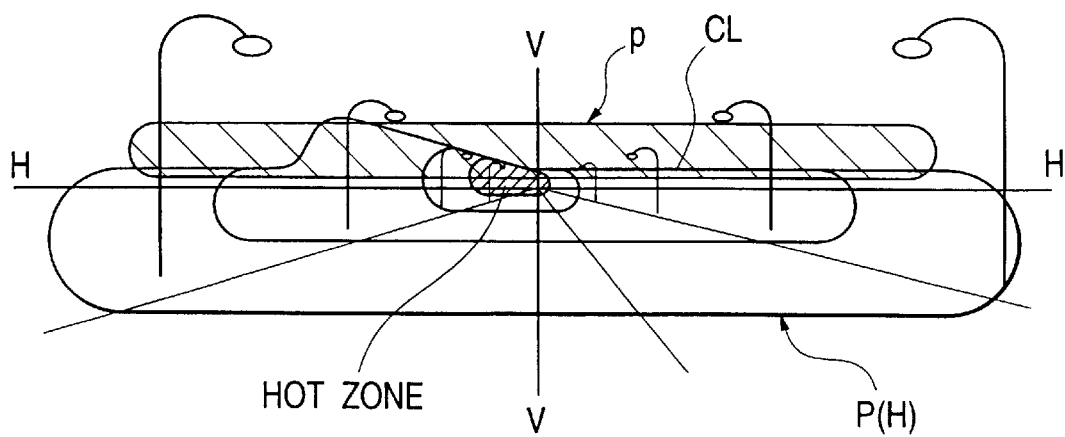
Figure 14A:
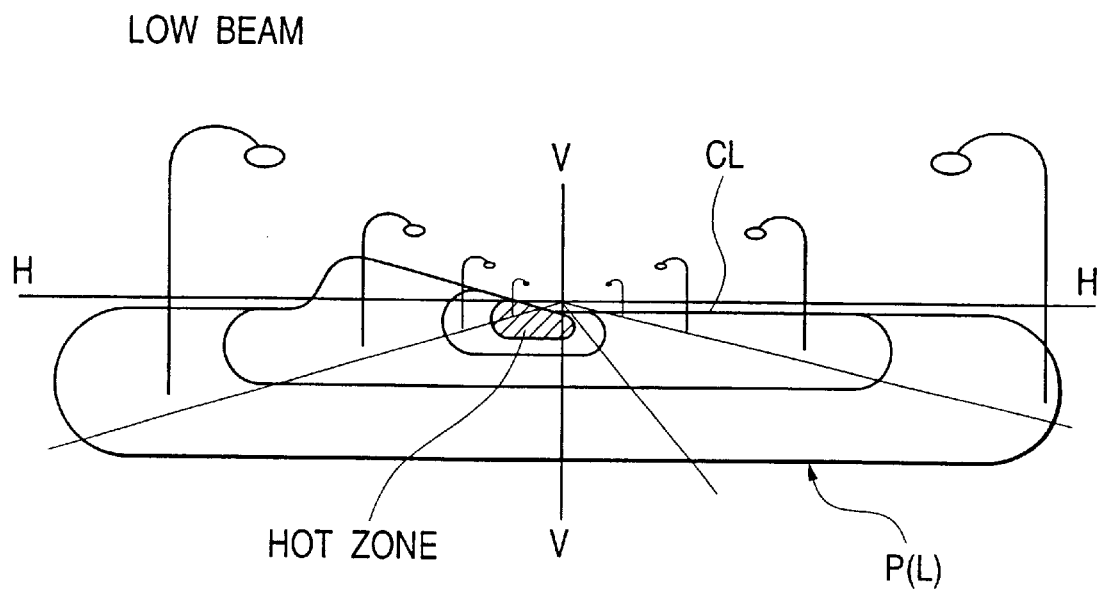
FIGS. 14A and 14B are conventional examples of a light distribution pattern chart.
Figure 14B:
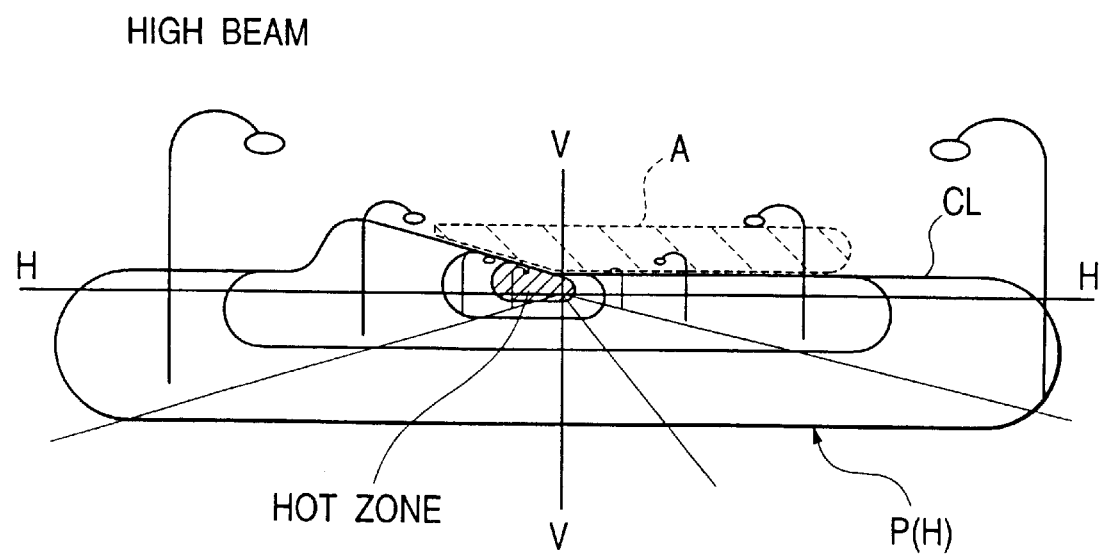

The upper end edge 22Bd of the second shade 22B is tilted slightly downward and backward slightly above the optical axis of Ax. Further, while the reflector 20 stays at the low-beam tilting angle position as shown in FIGS. 10 and 12A, as first and second shades 22A and 22B are overlapped, the light directed to the leading end portion of the shade 22 from the discharge light-emitting portion 18a of the light source bulb 18 is to be completely shut off. Thus, the low-beam light distribution pattern P(L) having the cutoff line CL is obtainable as shown in FIG. 13A.

Figure 11:
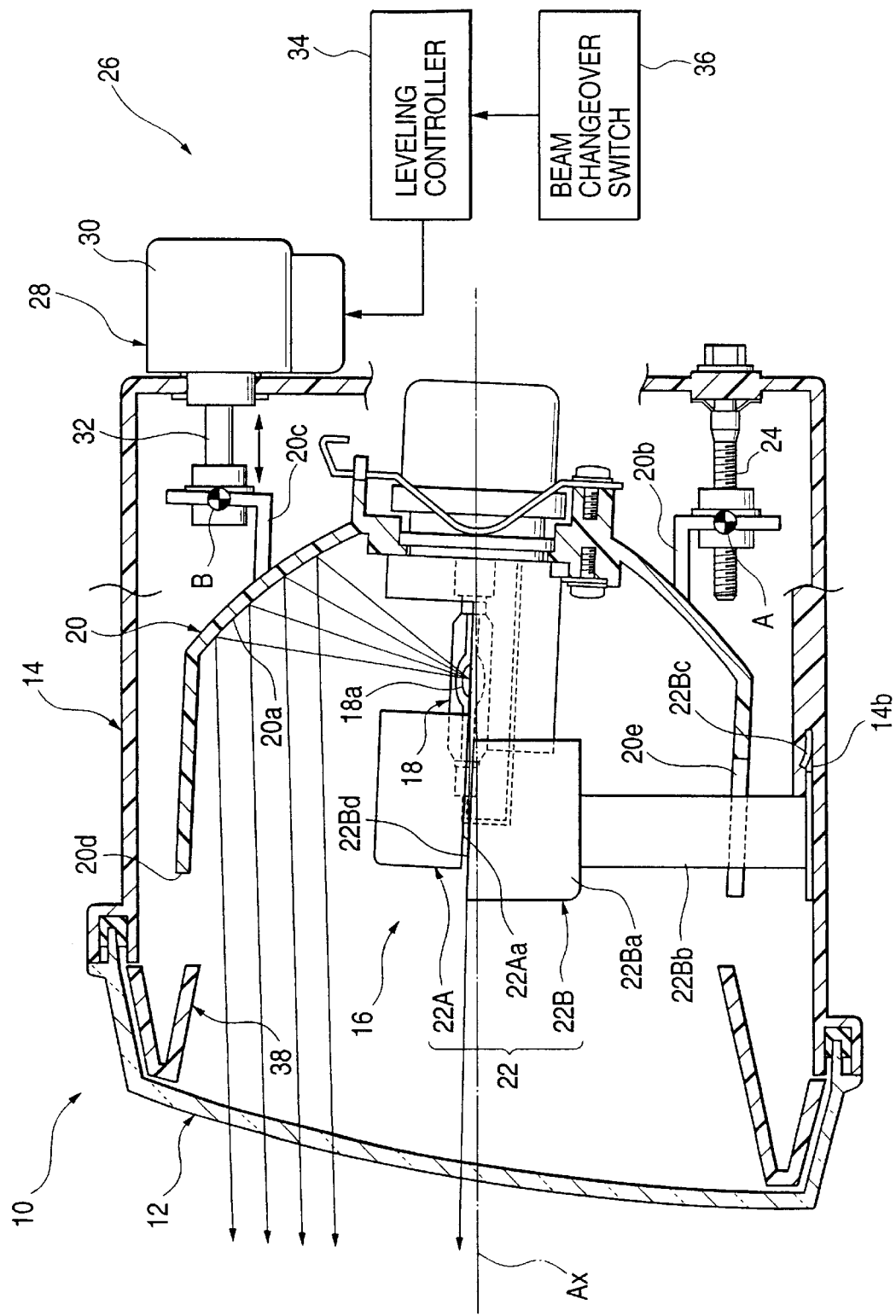
FIG. 11 is a sectional side view showing the operation of a third embodiment of the present invention.
Figure 12B:
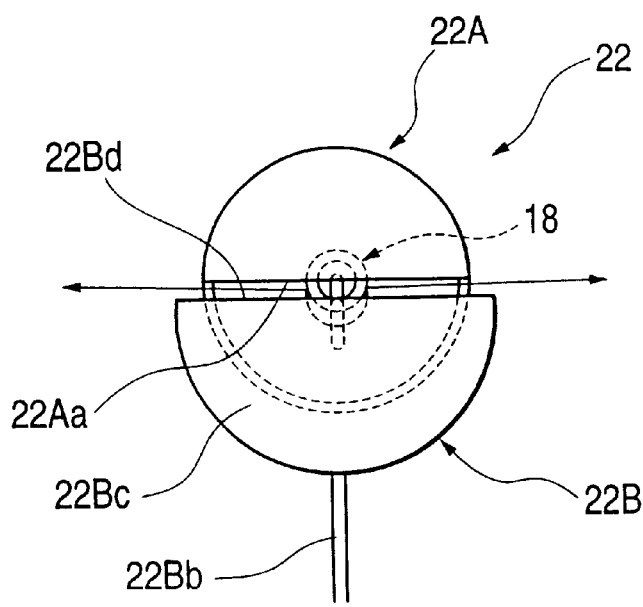

When the reflector 20 is tilted from the reference leveling angle position by 2° or greater, the lower end edge of the cutout portion 22Aa of the first shade 22A is vertically separated from the upper end edge 22Bd of the second shade 22B. When the reflector 20 is tilted up to the high-beam tilting angle position as shown in FIGS. 11 and 12B, there is formed a predetermined gap between the first and second shades 22A and 22B. Then the slightly-upward light leaked out of the gap between the first and second shades 22A and 22B is incident on the reflective surface 20a of the reflector 20 and reflected forward and upward. Upward direct light leaked out of the above gap is otherwise additionally emitted as the upward emission pattern p to the vicinity of the position over the cutoff line CL.

In the third embodiment of the present invention as set forth above in detail, the shade 22 is divided into the first and second shades 22A and 22B and when the low beam is switched to the high beam, the light leaked out of the gap between the first and second shades 22A and 22B is additionally emitted to the vicinity of the position over the cutoff line CL. While the low-beam light distribution pattern P(L) excellent in remote visibility is secured, the light distribution pattern P(H) capable of sufficiently securing upward forward visibility ahead of the vehicle during the high-beam vehicle traveling can be obtained.

Moreover, the definition of the cutoff line of the high-beam light distribution pattern P(H) can be lowered by additionally emitting the beam to the vicinity of the position over the cutoff line CL when the low beam is switched to the high beam, whereby a feeling of wrongness because of the presence of the cutoff line in the light distribution pattern P(H) becomes reducible during the high-beam traveling.

Since the upward emission pattern p is additionally emitted in this embodiment of the invention, the high-beam exposure quantity of light can be increased to that extent, whereby the upward forward visibility ahead of the vehicle during the high-beam traveling can be improved further.

Even in the third embodiment of the present invention, moreover, the modified light distribution pattern (see FIGS. 5A and 5B) of the first embodiment of the present invention may be adopted as a basic light distribution pattern and in that case, function and effect similar to those in the modified embodiment thereof are obtainable.

As stated above, the vehicle headlight according to the present invention is arranged so as to switch beams between the low and high beams by vertically tilting the reflector by the predetermined angle. When the low beam is switched to the high beam, moreover, part of the beam is deflected and emitted by the beam deflecting and emitting means to the vicinity of a position over the cutoff line in the way interlocked with the upward tilting of the reflector according to the first embodiment, whereas the beam generated by the additional-beam generating means is additionally emitted to the vicinity of the position over the cutoff line in the way interlocked with the upward tilting of the reflector according to the third embodiment.

Consequently, upward forward visibility ahead of the vehicle can be secured sufficiently during high-beam traveling by using a low-beam light distribution pattern as a light distribution pattern having the cutoff line.

With the beam deflected and emitted to the vicinity of the position over the cutoff line when the low beam is switched to the high beam, moreover, the definition of the cutoff line of a high-beam light distribution pattern can be lowered, whereby a feeling of wrongness because of the presence of the cutoff line in the light distribution pattern becomes reducible during the high-beam traveling.

In the first embodiment, the "beam deflecting and emitting means" is not limited to any specific form as long as part of the beam is deflected and emitted to the vicinity of the position over the cutoff line in the way interlocked with the upward tilting of the reflector.

As the specific form of the "beam deflecting and emitting means," the beam deflecting and emitting means may be an upward deflection prism fixedly supported by the lamp body in such a way that the upward deflection prism is projected from the upper side of the reflector up to the vicinity of the height position of the upper end edge of the reflective surface of the reflector in front of the reflector. With the adoption of an arrangement like this, the light reflected from the reflector is made incident on the upward deflection prism, deflected upward and passed therethrough only when the reflector stays at the high-beam tilting angle position. Thus, the light deflected and emitted to the vicinity of the position over the cutoff line can be obtained by a simple arrangement. The "upward deflection prism" may be a simple prism or otherwise what is provided with additional functions such as lateral diffusing and deflecting functions.

Alternatively, in the second embodiment, the light deflected and emitted to the vicinity of the position over the cutoff line can also be obtained from an arrangement wherein the reflector is divided into an upper reflector for fixedly supporting the light source bulb and a lower reflector disposed under the upper reflector, the upper reflector being tiltably supported by the lamp body, the lower reflector being fixedly supported by the lamp body; wherein when the upper reflector is in a tilted angle position for the low beam, the upper reflector forms a first light distribution pattern having the cutoff line, whereas the lower reflector forms a second light distribution pattern on the lower side of the cutoff line and wherein the upper reflector is supported by the lamp body so that the light emitting portion of the light source bulb will be displaced forward when the upper reflector is tilted upward. In this case, it is possible to secure a sufficient quantity of light to be deflected and emitted to the vicinity of the position over the cutoff line.

In the third embodiment, the "additional-beam generating means" is not limited to any specific form as long as the additional-beam generating means is used for generating the beam additionally emitted to the vicinity of the position over the cutoff line in the way interlocked with the upward tilting of the reflector.

As the specific form of the "additional-beam generating means", the additional-beam generating means may include a first shade fixedly supported by the reflector in such a way as to surround the substantially upper half of the light source bulb in a predetermined position of the optical axis of the reflector, and a second shade fixedly supported by the reflector in such a way as to surround the substantially lower half of the light source bulb which is not surrounded by the first shade. With the adoption of this arrangement, the lower end edge of the first shape is vertically separated from the upper end edge of the second shade when the reflector is tilted upward by the predetermined angle. Further, the light caused to leak from the gap therebetween is utilized as the beam additionally emitted to the vicinity of the position over the cutoff line when the low beam is switched to the high beam.

Recently, a typical vehicle headlight is often fitted with a leveling unit for vertically varying the direction of emitting a beam as the posture of a vehicle body changes in order to emit a low beam in an optimum direction. Particularly when a discharge bulb is used as a light source bulb, the necessity of installing the leveling unit is increasing because of greater power the bulb needs. Therefore, in view of the above, the beam switching device according to the present invention may be employed as a device for special use in switching beams. When the leveling unit is installed, however, it may be arranged to tilt the reflector vertically by driving the actuator of the leveling unit and in so doing, switching beams can be carried out less costly. Even when such a leveling unit is employed as the beam switching device, the possibility of interfering leveling adjustment can be avoided by setting the upward angle of the reflector greater than the maximum upward adjusting angle of the reflector at the leveling time when the low beam is switched to the high beam.

In addition, the aforementioned "leveling unit" may be an automatic leveling unit for controlling the alteration of the direction of emitting a low beam automatically and vertically as the posture of a vehicle body changes, or a manual leveling unit for adjusting the direction of emitting a low beam manually and vertically as the posture of a vehicle body changes.

The previous description of the preferred embodiments are provided to enable a person skilled in the art to make or use the present invention. Moreover, various modifications to the above embodiment will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A vehicle headlight comprising:
   a light source bulb;
   a reflector for emitting a beam with a light distribution pattern having a cutoff line by reflecting light forward from said light source bulb;
   a lamp body tiltably supporting said reflector;
   a beam switching device selectively switching said beam between a low beam and a high beam by vertically tilting said reflector by a predetermined angle; and
   beam deflecting and emitting means for deflecting and emitting part of said beam to a position over said cutoff line in conjunction with an upward tilting of said reflector when said low beam is switched to said high beam, wherein said beam deflecting and emitting means is supported by said lamp body.

2. The vehicle headlight as claimed in claim 1, wherein said beam deflecting and emitting means comprises an upward deflection prism fixedly supported by said lamp body, said upward deflection prism projecting downwardly from above said reflector to a vicinity of a height of an upper end edge of a reflective surface of said reflector in front of said reflector.

3. The vehicle headlight as claimed in claim 1, wherein said reflector is divided into an upper reflector for fixedly supporting said light source bulb and a lower reflector disposed under said upper reflector, said upper reflector being tiltably supported by said lamp body and said lower reflector being fixedly supported by said lamp body.

4. A vehicle headlight comprising:
   a light source bulb;
   a reflector for emitting a beam with a light distribution pattern having a cutoff line by reflecting light forward from said light source bulb;
   a lamp body tiltably supporting said reflector;
   a beam switching device selectively switching said beam between a low beam and a high beam by vertically tilting said reflector by a predetermined angle; and
   additional-beam generating means for generating an additional-beam to be emitted to a position over said cutoff line in conjunction with an upward tilting of said reflector when said low beam is switched to said high beam, wherein said additional-beam generating means is supported by said lamp body.

5. The vehicle headlight as claimed in claim 4, said additional-beam generating means including a first shade fixedly supported by said reflector to substantially surround an upper half of said light source bulb in a predetermined position with respect to an optical axis of said reflector, and a second shade fixedly supported by said lamp body to substantially surround a lower half of said light source bulb.

6. The vehicle headlight as claimed in claim 1, further comprising a leveling unit for varying a direction of emitting said beam vertically as a vehicle body position changes,
   wherein said beam switching device controls said reflector to tilt vertically by driving an actuator of said leveling unit.

7. The vehicle headlight as claimed in claim 6, wherein said actuator of said leveling unit includes an output rod displaced in a leveling adjustment range for leveling adjustment, and said beam switching device controls said reflector to tilt vertically by driving said output rod of said actuator out of said leveling adjustment range.

8. The vehicle headlight as claimed in claim 1, wherein said beam deflecting and emitting means comprises an upward deflection prism fixedly supported by said lamp body, said upward deflection prism projecting from said lamp body and into part of said beam reflected from said reflector when said low beam is switched to said high beam.

9. The vehicle headlight as claimed in claim 3, wherein, for said low beam, said upper reflector forms a first light distribution pattern having said cutoff line, whereas said lower reflector forms a second light distribution pattern on a lower side of said cutoff line.

10. The vehicle headlight as claimed in claim 9, wherein said upper reflector is supported by said lamp body so that a light emitting portion of said light source bulb displaces forward when said upper reflector is tilted upward.

11. The vehicle headlight as claimed in claim 9, wherein when said upper reflector is tilted for said high beam said lower reflector forms said second light distribution pattern on an upper side of said cutoff line.

12. The vehicle headlight as claimed in claim 5, wherein there is formed a predetermined gap between said first shade and said second shade when said low beam is switched to said high beam so that additional said beam is emitted to said position over said cutoff line.

13. The vehicle headlight as claimed in claim 2, further comprising a leveling unit for varying a direction of emitting said beam vertically as a vehicle body position changes,
   wherein said beam switching device controls said reflector to tilt vertically by driving an actuator of said leveling unit.

14. The vehicle headlight as claimed in claim 3, further comprising a leveling unit for varying a direction of emitting said beam vertically as a vehicle body position changes,
   wherein said beam switching device controls said reflector to tilt vertically by driving an actuator of said leveling unit.

15. The vehicle headlight as claimed in claim 4, further comprising a leveling unit for varying a direction of emitting said beam vertically as a vehicle body position changes,
   wherein said beam switching device controls said reflector to tilt vertically by driving an actuator of said leveling unit.

16. The vehicle headlight as claimed in claim 15, wherein said actuator of said leveling unit includes an output rod displaced in a leveling adjustment range for leveling adjustment, and said beam switching device controls said reflector to tilt vertically by driving said output rod of said actuator out of said leveling adjustment range.

17. The vehicle headlight as claimed in claim 5, further comprising a leveling unit for varying a direction of emitting said beam vertically as a vehicle body position changes, wherein said beam switching device controls said reflector to tilt vertically by driving an actuator of said leveling unit.

18. A vehicle headlight comprising:

a light source bulb;

a reflector for emitting a beam with a light distribution pattern having a cutoff line by reflecting light forward from said light source bulb;

a lamp body tiltably supporting said reflector;

a beam switching device selectively switching said beam between a low beam and a high beam by vertically tilting said reflector by a predetermined angle; and a deflecting and emitting member to deflect and emit part of said beam to a position over said cutoff line in conjunction with an upward tilting of said reflector when said low beam is switched to said high beam, wherein said beam deflecting and emitting member is supported by said lamp body.

19. A vehicle headlight comprising:

a light source bulb;

a reflector for emitting a beam with a light distribution pattern having a cutoff lien by reflecting light forward form said light source bulb;

a lamp body tiltably supporting said reflector;

a beam switching device selectively switching said beam between a low beam and a high beam by vertically tilting said reflector by a predetermined angle; and an additional-beam generating member to generate a beam to be additionally emitted to a position over said cutoff line in conjunction with an upward tilting of said reflector when said low beam is switched to said high beam, wherein said additional-beam generating member is supported by said lamp body.

* * * * *